(12) United States Patent
Amonou

(10) Patent No.: US 9,681,129 B2
(45) Date of Patent: Jun. 13, 2017

(54) SCALABLE VIDEO ENCODING USING A HIERARCHICAL EPITOME

(75) Inventor: Isabelle Amonou, Cesson Sevigne (FR)

(73) Assignee: ORANGE, Paris (FR)

( * ) Notice: Subject to any disclaimer, the term of this patent is extended or adjusted under 35 U.S.C. 154(b) by 683 days.

(21) Appl. No.: 13/881,646

(22) PCT Filed: Oct. 18, 2011

(86) PCT No.: PCT/FR2011/052433
§ 371 (c)(1),
(2), (4) Date: Apr. 25, 2013

(87) PCT Pub. No.: WO2012/056148
PCT Pub. Date: Mar. 5, 2012

(65) Prior Publication Data
US 2013/0223529 A1    Aug. 29, 2013

(30) Foreign Application Priority Data

Oct. 25, 2010 (FR) ...................... 10 58750

(51) Int. Cl.
*H04N 7/26* (2006.01)
*H04N 19/187* (2014.01)
(Continued)

(52) U.S. Cl.
CPC ..... *H04N 19/00569* (2013.01); *H04N 19/105* (2014.11); *H04N 19/109* (2014.11);
(Continued)

(58) Field of Classification Search
CPC ........ H04N 19/30; H04N 19/33; H04N 19/61; H04N 19/59; H04N 19/105; H04N 19/187
See application file for complete search history.

(56) References Cited

U.S. PATENT DOCUMENTS

2006/0222067 A1* 10/2006 Park ..................... H04N 19/105
375/240.08
2009/0208110 A1* 8/2009 Hoppe .................. G06T 7/407
382/190

(Continued)

OTHER PUBLICATIONS

Qijun Wang et al., "Improving Intra Coding in H.264\AVC by Image Epitome", 2009, National Engineering Research Center for Multimedia Software (NERCMS), Wuhan University, Hubei Province, China, 190-200.*

(Continued)

*Primary Examiner* — Dave Czekaj
*Assistant Examiner* — Alison Slater
(74) *Attorney, Agent, or Firm* — David D. Brush; Westman, Champlin & Koehler, P.A.

(57) ABSTRACT

A method and apparatus are provided for encoding an image sequence and outputting a signal having a layered organization with at least a base layer and an enhancement layer. For at least one current image of the sequence, the method includes constructing a hierarchical epitome associated with the enhancement layer corresponding to a maximum resolution level of the current image, using: an epitome associated with the enhancement layer corresponding to the maximum resolution level of the current image; and at least one epitome associated with a preceding layer corresponding to a resolution level lower than the maximum resolution level of the current image.

11 Claims, 3 Drawing Sheets

(51) Int. Cl.
| | |
|---|---|
| *H04N 7/12* | (2006.01) |
| *G06K 9/36* | (2006.01) |
| *G06K 9/46* | (2006.01) |
| *H04N 7/32* | (2006.01) |
| *H04N 19/30* | (2014.01) |
| *H04N 19/50* | (2014.01) |
| *H04N 19/105* | (2014.01) |
| *H04N 19/176* | (2014.01) |
| *H04N 19/46* | (2014.01) |
| *H04N 19/109* | (2014.01) |
| *H04N 19/192* | (2014.01) |
| *H04N 19/33* | (2014.01) |
| *H04N 19/59* | (2014.01) |

(52) U.S. Cl.
CPC ......... *H04N 19/176* (2014.11); *H04N 19/187* (2014.11); *H04N 19/192* (2014.11); *H04N 19/33* (2014.11); *H04N 19/46* (2014.11); *H04N 19/50* (2014.11); *H04N 19/59* (2014.11)

(56) References Cited

U.S. PATENT DOCUMENTS

2012/0288015 A1* 11/2012 Zhang ................ H04N 7/54
    375/240.26
2013/0148717 A1* 6/2013 Yitschak .......... H04N 19/00521
    375/240.01

OTHER PUBLICATIONS

English Translation of the International Preliminary Report on Patentability and Written Opinion of the International Searching Authority dated Apr. 30, 2013 for corresponding International Application No. PCT/FR2011/052433 filed Oct. 18, 2011.

International Search Report and Written Opinion dated Feb. 1, 2012 for corresponding International Application No. PCT/FR2011/052433 filed Oct. 18, 2011.

Qijun Wang et al:"Spatially Scalable Video Coding Based on Hybrid Epitomic Resizing", Data Compression Conference (DCC), 2010, IEEE Piscataway, NJ, US, Mar. 24, 2010 (Mar. 24, 2010), pp. 139-148, XP31661655.

Qijun Wang et al: "Intra Coding and Refresh Based on Video Epitomic Analysis", Multimedia and Expo (ICME), 2010 IEEE International Conference on, IEEE, Piscataway, NJ, USA, Jul. 19, 2010 (Jul. 19, 2010), pp. 452-455, XP031761412.

Vincent Cheung et al: "Video Epitomes", International Journal of Computer Vision, Kluwer Academic Publishers, BO, vol. 76, No. 2, Dec. 23, 2006 (Dec. 23, 2006), pp. 141-152, XP019581846.

Qijun Wang et al: "Improving Intra Coding in H.264\AVC by Image Epitome", National Engineering Research Center for Multimedia Software (NERCMS), Wuhan University, Hubei Province, China, 2009, p. 190-200.

French Search Report dated May 19, 2011 for corresponding French Application No. 1058750 filed Oct. 25, 2010, 8 pages.

* cited by examiner

SCALABLE VIDEO ENCODING USING A HIERARCHICAL EPITOME

CROSS-REFERENCE TO RELATED APPLICATIONS

This Application is a Section 371 National Stage Application of International Application No. PCT/FR2011/052433, filed Oct. 18, 2011, which is incorporated by reference in its entirety and published as WO 2012/056148 on May 3, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The field of the invention is that of the encoding and decoding of images or sequences of images and especially of video streams.

More specifically, the invention pertains to the encoding and decoding of scalable data streams with adaptable quality and variable space-time resolution.

The invention can be applied especially to video encoding/decoding implemented in SVC (Scalable Video Coding) type encoders/decoders.

BACKGROUND

1. General Principle of Scalable Video Encoding

Today, many data transmission systems are heterogeneous in that they serve a plurality of clients having highly varied types of access to data. Thus, for example, the Internet is accessible both from a personal computer (PC) and from a mobile telephone. More generally, the network accessing bandwidth, the processing capacities of the client terminals and the size of their screens vary greatly from one user to another. Thus, for example, a first client can access the Internet from a powerful PC and have an ADSL (Asymmetric Digital Subscriber Line) bit rate, whereas a second client tries to access the same data at the same point in time from a PDA (Personal Digital Assistant) connected to a modem with a low bit rate.

To meet these different needs, scalable image encoding algorithms have been developed, providing an adaptable quality and a variable space-time resolution. According to these techniques, the encoder generates a compressed stream with a layered structure. For example, a first data layer conveys a 256-kbits/s stream which could be decoded by a PDA type terminal, and a second complementary data layer conveys a stream with a resolution higher than 256 kbits/s which could be decoded, as a complement to the first one, by a more powerful PC type terminal. In this example the bit rate needed to convey these two nested layers is 512 kbits/s.

Such encoding algorithms are thus very useful for all the applications for which the generation of a single compressed stream, organized in several layers of scalability, can serve several clients with different characteristics.

2. The SVC Encoder

The SVC standard corresponding to the amendment number 3 of the AVC H264/MPEG-4 standard, part 10, more particularly defines the structure of scalable video streams. Such a stream comprises a basic layer also called a base level compatible with AVC H264/MPEG-4 standard, part 10, and one or more enhancement layers. The enhancement layers are encoded by prediction relatively to a preceding layer (inter-layer prediction) and, classically, relatively to other images of the sequence (intra prediction or classic time prediction). It may be recalled that, for inter-layer prediction, three types of predictions can be used: motion vector prediction, prediction of residues derived from the prediction, and texture prediction.

More specifically, FIG. 1 illustrates the structure of an SVC encoder of this kind, having three layers of different spatial resolutions (one base resolution level and two higher resolution levels).

The video input components 10 at the highest resolution level and the video input components sub-sampled at least once by 2D spatial decimation (11)) at the lower resolution levels, enter a module 12 implementing operations of time decomposition and motion estimation.

Such a module 12 feeds the motion estimation and compensation modules 13 from motion information 14, and feeds intra-prediction modules 16 from textural information 15.

The data, output from the intra-prediction module 16, feeds a transformation and entropic encoding block 17. The data coming from this block 17 serves especially to achieve a 2D spatial interpolation (18) from the level of lower resolution. Finally, a multiplexing module 19 orders the different sub-streams generated into an overall compressed data stream 20.

In other words, the input sequence is sub-sampled at least once and the SVC encoder performs the following steps:
- the base level is encoded with a basic quality;
- the enhancement levels are encoded with a higher quality;
- the pieces of textural and motion information are refined;
- the difference between the different levels of resolution is determined and this difference is encoded (entropic encoding).

3. The Epitomes

In order to improve image compression or image sequences compression, Q. Wang, R. Hu and Z. Wang in "*Improving Intra Coding in H.264\AVC by Image Epitome, Advances in Multimedia Information Processing*" have proposed a novel technique of intra prediction for AVC encoders/decoders based on the use of epitomes or jigsaws.

An epitome is a condensed and generally miniature version of an image containing the main components of textures and contours of this image. The size of the epitome is generally reduced as compared with that of the original image but the epitome always contains the constituent elements most relevant for rebuilding of the image. As described in the above-mentioned document, the epitome can be built by using a maximum likelihood estimation (MLE) type of technique associated with an expectation/maximization (EM) type of algorithm. Once the epitome has been built for the image, it can be used to rebuild (synthesize) certain parts of the image.

In particular, in the above-mentioned document, Q. Wang et al. have proposed the generation of an epitome iteratively. A pyramid of epitomes is thus made in which, classically, the epitome obtained by means of a lower level image during one iteration serves, after interpolation, as an initializing value for generating the epitome corresponding to the higher level image during another iteration. The epitome generated from a sub-sampled image is therefore used to generate the epitome associated with the image in its non-sampled version.

Unfortunately, in this approach, the epitome associated with the image in its non-sampled (high-resolution) version is built from a "low-resolution" epitome corresponding to a "degraded" version of the image, in over-sampling this low-resolution epitome. The prediction of the image in its non-sampled version is therefore not of high quality.

Furthermore, the epitomes obtained at different levels of resolution can be very different. Thus, the epitome built directly at the i+1 resolution level can be very different from an epitome built at the i resolution level during a first iteration and over-sampled at the i+1 resolution level. The consistency of the information between the i resolution level and a layer of a higher resolution level (i+1) is therefore not ensured and it is not possible to accurately predict a layer of a level of higher resolution (i+1) relatively to a layer with a level of lower resolution (i). The epitome associated with the image in its non-sampled version according to this approach therefore cannot be used by a scalable video encoder/decoder such as SVC.

SUMMARY

The invention proposes a novel method for encoding a sequence of images, delivering a signal having a layered organization comprising at least one base layer and one enhancement layer, an enhancement layer corresponding to a level of resolution of an image of said sequence higher than a level of resolution of at least one preceding layer, and being encoded by prediction at least from said at least one preceding layer.

According to the invention, such a method implements, for at least one current image of the sequence, a step for building a hierarchical epitome associated with the enhancement layer corresponding to the level of maximum resolution of the current image, from:
  an epitome associated with the enhancement layer corresponding to the level of maximum resolution of the current image; and
  at least one epitome associated with a preceding layer corresponding to a level of resolution lower than the level of maximum resolution of the current image.

The invention thus proposes a novel multi-resolution hierarchical epitome that can be used for intra-layer (intra or inter) prediction or inter-layer prediction in scalable video encoders/decoders.

According to the invention, an epitome is generated at the level of maximum resolution (from the current image) and at least one epitome at a level of lower resolution (from the sub-sampled current image) to build the hierarchical epitome. The invention therefore starts with the image at the highest resolution level to build the hierarchical epitome.

This top-bottom approach ensures the consistency and therefore the predictability of the information between the layers of different resolution levels.

It thus offers novel modes of prediction to the encoders/decoders in a multi-resolution context.

In particular, the higher the resolution of the hierarchical epitome (i.e. the higher the level of maximum resolution of the current image), the greater the extent to which it enables the prediction of the current image with high quality and/or resolution.

Thus, according to one particular characteristic, the method for encoding according to the invention implements a step for predicting the current image from the hierarchical epitome.

According to one particular embodiment, the building step implements at least one iteration of the following steps:
  at least one sub-sampling of the epitome at the level of higher resolution so as to obtain an epitome at a level of lower resolution;
  verification of an encoding criterion:
    if the encoding criterion is not attained:
      refining of the epitome at a level of lower resolution, delivering a refined epitome at the level of lower resolution;
      at least one over-sampling of the refined epitome at the level of lower resolution, delivering a new epitome at a level of higher resolution;
      refining the epitome at the level of higher resolution;
    if said encoding criterion is attained:
      obtaining the hierarchical epitome, corresponding to the epitome at the level of maximum resolution obtained after refining, and stopping of the iterations;
  where, for the first iteration, the level of higher resolution is the level of maximum resolution.

In particular, the step for refining, performed at different levels of resolution, eliminates at least one portion of the epitome generated at the corresponding level of resolution.

In this way, the prediction of the image obtained from the refined epitome is of better quality.

According to one particular characteristic of the invention, the encoding criterion takes account of a quality of prediction associated with different levels of resolution and a cost of encoding of the hierarchical epitome.

In this way, we obtain a hierarchical epitome that gives an efficient compromise between an effective encoding of the sequence of images by prediction from this epitome at the different levels of resolution and an efficient encoding of the hierarchical epitome itself.

According to another aspect of the invention, the method for encoding comprises a step for transmitting the hierarchical epitome to at least one decoder which is designed to decode the sequence of images.

In this case, the data transmitted remains compact since the epitome is a condensed version of an image.

Furthermore, the decoder can then use this hierarchical epitome as a reference image for its inter-image prediction.

According to yet another aspect, the hierarchical epitome is determined from a set of at least two images of the sequence.

A hierarchical epitome of this kind is built out of several images of the sequence and is therefore representative of a part of the sequence. The invention thus enables a more efficient prediction of the current image from this hierarchical epitome.

In particular, the current image and the set of images used to build the hierarchical epitome belong to same sub-sequence of the sequence. For example, a sub-sequence of this kind belongs to the group comprising:
  a same image plane;
  a GOP (group of pictures) comprising for example P and B type images located between two I type images according to the order of encoding of the sequence, as defined according to the H263, MPEG2, and other standards.

The set of images used to build the hierarchical epitome can also be a list of reference images of the current image, defined for example according to the MPEG4, H.264 and other standards.

In yet another embodiment, the invention pertains to a device for encoding a sequence of images delivering a signal having a layered organization comprising at least one base layer and one enhancement layer, an enhancement layer corresponding to a level of resolution of an image of the sequence higher than the level of resolution of at least one preceding layer, and being encoded by prediction at least from said at least one preceding layer.

According to the invention, a device of this kind comprises means for building a hierarchical epitome associated with the enhancement layer corresponding to the level of maximum resolution of a current image of the sequence, from:
- an epitome associated with the enhancement layer corresponding to the level of maximum resolution of the current image; and
- at least one epitome associated with a preceding layer corresponding to a level of resolution lower than the level of maximum resolution of the current image.

Such an encoder is especially suited to implementing the method for encoding described here above. It may for example be an SVC video encoder. This encoding device could of course comprise the different characteristics of the method for encoding according to the invention. Thus, the characteristics and advantages of this encoder are the same as those of the method for encoding and shall not be described in more ample detail.

The invention also pertains to a signal representing a sequence of images encoded according to the method for encoding described here above, having a layered organization comprising at least one base layer and one enhancement layer, an enhancement layer corresponding to a level of resolution of the sequence that is higher than the level of resolution of at least one preceding layer, and being encoded by prediction on the basis of the at least one preceding layer.

According to the invention, a hierarchical epitome associated with the enhancement layer corresponding to the level of maximum resolution of a current image of the sequence being built from:
- an epitome associated with the enhancement layer corresponding to the level of maximum resolution of the current image; and
- at least one epitome associated with a preceding layer corresponding to a level of resolution lower than the level of maximum resolution of the current image;
- the signal carries at least one indicator signaling a use of the hierarchical epitome to predict the current image and/or a presence of the hierarchical epitome in the signal.

Thus, an indicator of this kind makes it possible to indicate the mode of prediction used to the decoder and to indicate whether it can read the hierarchical epitome in the image or whether it should rebuild it.

This signal could of course comprise the different features of the method for encoding according to the invention.

The invention also pertains to a recording medium carrying the signal as described here above.

Yet another aspect of the invention pertains to a method for decoding a signal representing a sequence of images having a layered organization comprising at least one base layer and one enhancement layer, an enhancement layer corresponding to a level of resolution of an image of the sequence higher than the level of resolution of at least one preceding layer and being encoded by prediction at least on the basis of at least one preceding layer.

According to the invention, such a method for decoding implements, for at least one image to be rebuilt of the sequence, a step for obtaining a hierarchical epitome associated with the enhancement layer corresponding to the level of maximum resolution of the image to be rebuilt, said hierarchical epitome being built during encoding from:
- an epitome associated with the enhancement layer corresponding to the level of maximum resolution of the image to be rebuilt; and
- at least one epitome associated with a preceding layer corresponding to a level of resolution lower than the level of maximum resolution of the image to be rebuilt, and transmitted in the signal,
- or else being rebuilt when decoding.

The invention thus makes it possible to retrieve the hierarchical epitome at the decoder and predict the image to be rebuilt from this hierarchical epitome. It therefore proposes a novel mode of prediction.

Such a method of decoding is suited especially to decoding a sequence of images encoded according to the above-described method for encoding. The characteristics and advantages of this method for decoding are therefore the same as those of the method for encoding and are not described in more ample detail.

In particular, according to a first embodiment, the method for obtaining applies a rebuilding of the hierarchical epitome. The method for decoding then uses the same building step as when encoding. The hierarchical epitome is therefore not transmitted in the signal, thus improving the quality of the data (which can be predicted on the basis of a epitome of greater volume) and the compactness of the data transmitted.

It can be noted that, to be rebuilt at the decoder, the hierarchical epitome should have been built at the encoder solely on the basis of causal information.

According to a second embodiment, the hierarchical epitome is built when encoding and transmitted in the signal, and the step for obtaining implements a step for reading the hierarchical epitome in the signal.

As a variant, for decoding at least one image following the image to be rebuilt according to an order of decoding of the sequence, the method for decoding comprises a step for updating the hierarchical epitome from a complementary hierarchical epitome transmitted in the signal.

According to yet another aspect of the invention, the method for decoding comprises a step for predicting the image to be rebuilt from the hierarchical epitome.

In another embodiment, the invention pertains to a device for decoding a signal representing a sequence of images having a layered organization comprising at least one base layer and one enhancement layer, an enhancement layer corresponding to level of resolution of an image of the sequence higher than a level of resolution of at least one preceding layer, and being encoded by prediction at least from said at least one preceding layer.

According to the invention, such a device comprises means for obtaining a hierarchical epitome associated with the enhancement layer corresponding to the level of maximum resolution of an image to be rebuilt of the sequence, said hierarchical epitome being built, when encoding, from:
- an epitome associated with the enhancement layer corresponding to the level of maximum resolution of the image to be rebuilt; and at least one epitome associated with a preceding layer corresponding to a level of resolution lower than the level of maximum resolution of the image to be rebuilt; and being transmitted in the signal or else being rebuilt when decoding.

Such a decoder is adapted especially to implementing the method for decoding described here above. It may for example be an SVC type video decoder.

This decoding device could of course include the different characteristics of the method for decoding according to the invention.

The invention also pertains to a computer program comprising instructions for implementing a method for encoding and/or a method for decoding as described here above when this program is executed by a processor. Such a program can use any programming language whatsoever. It can be downloaded from a communications network and/or recorded on a computer-readable carrier.

BRIEF DESCRIPTION OF THE DRAWINGS

Other features and advantages of the invention shall appear more clearly from the following description of a particular embodiment, given by way of a simple, illustratory and non-exhaustive example, and from the appended drawings, of which.

DESCRIPTION OF ONE EMBODIMENT OF THE INVENTION

1. General Principle

The general principle of the invention relies on the building of at least specific epitome which can be used for a multi-resolution prediction of the images in a context of encoding/decoding at different levels of resolution. An epitome of this kind is therefore "scalable", "hierarchical", or again "multi-resolution".

More specifically, for at least one current image of a sequence of images, the hierarchical epitome is associated with the enhancement layer corresponding to the level of maximum resolution of a current image to be encoded/decoded, and built from:
  an epitome associated with the enhancement layer corresponding to the level of maximum resolution of the current image; and
  at least one epitome associated with a preceding layer corresponding to a level of resolution lower than the level of maximum resolution of the current image.

An epitome is therefore generated at the level of maximum resolution (from the current image in its original version, i.e. its non-sampled version), and at least one epitome is generated at a level of lower resolution (from the sub-sampled current image) to build the hierarchical epitome. The hierarchical epitome is therefore determined according to a multi-resolution approach.

The hierarchical epitome thus built can be used to achieve an intra or inter prediction within a same layer, or an inter-layer prediction, at the level of an encoder or a decoder of an SVC type for example. The greater the resolution of the epitome (i.e. the higher the level of maximum resolution of the current image), the higher the quality and/or resolution with which the current image can be predicted.

On the contrary, it may be recalled that the epitomes generated according to the prior-art techniques do not enable the performance of hierarchical decoding (i.e. in an SVC type context). Indeed, it planned according to the prior art only to transmit an epitome with a given level of resolution and to use this epitome in a mono-resolution intra-prediction context.

Figure 2:
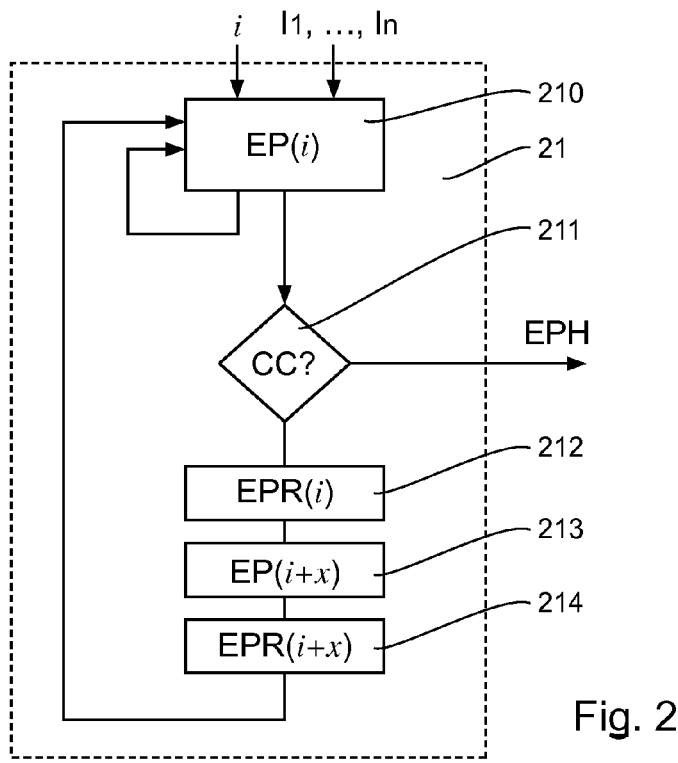
FIG. 2 illustrates the main steps in the building of a hierarchical epitome according to the invention.

The main steps implemented to build a hierarchical epitome according to one embodiment of the invention are illustrated especially in FIG. 2.

More specifically, according to this embodiment, the building step 21 implements at least one iteration of the following steps:
  at least one sub-sampling 210 of the epitome at the level of higher resolution, so as to obtain an epitome at a level of lower resolution EP(i);
  verification 211 of an encoding criterion CC:
    if the encoding criterion CC is not achieved:
      refining 212 of the epitome at a level of lower resolution, delivering a refined epitome at the level of lower resolution EPR(i);
      at least one over-sampling 213 of the refined epitome at the level of lower resolution, delivering a new epitome at a level of higher resolution EP(i+x);
      refining 214 of the epitome at the level of higher resolution, delivering a refined epitome EPR(i+x);
    if the encoding criterion is obtained:
      obtaining the hierarchical epitome EPH corresponding to the epitome at the level of maximum resolution obtained after refining, and stopping the iterations.

It can be noted that, for the first iteration, the level of higher resolution is the level of maximum resolution.

The step 21 for building a hierarchical epitome according to FIG. 2 can especially be implemented in an SVC type encoder or decoder. The invention then proposes to use a hierarchical epitome to encode a sequence of images in the SVC format.

2. Working of the Encoder

Figure 3:
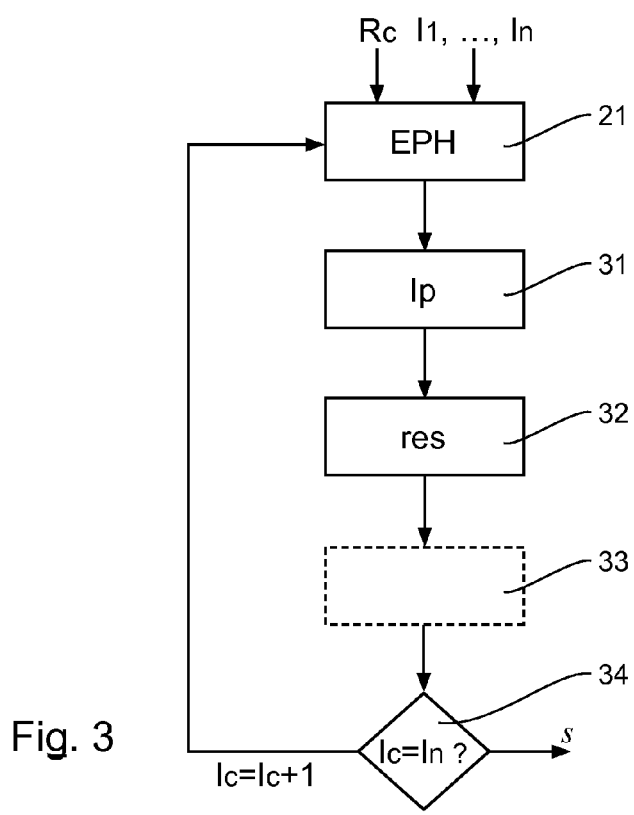
FIGS. 3 and 4 respectively describe the main steps implemented by an encoder or a decoder according to one particular embodiment of the invention.

Here below, referring to FIG. 3, we present an example of the main steps implemented in an SVC type encoder with two levels of spatial resolution.

Figure 1:
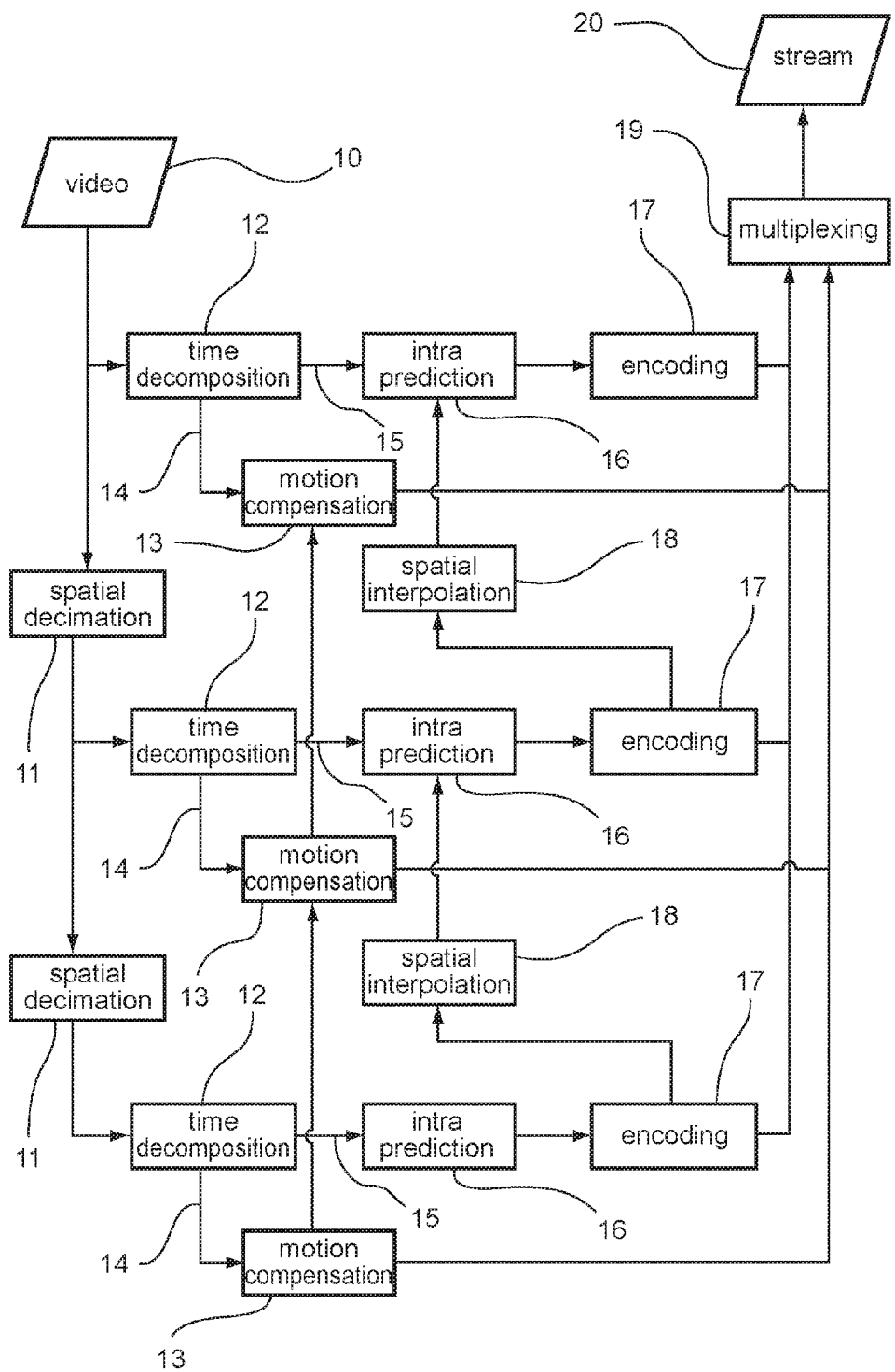
FIG. 1 described with reference to the prior art illustrates the structure of a classic SVC-type encoder.

We thus consider a video encoder receiving at input a sequence of images I1 to In, as well as a level of maximum resolution. For example, we consider two levels of spatial resolution: the level i, corresponding to the level of maximum resolution (high definition HD in digital television for example) and the level i−1, corresponding to a level of lower resolution (SD standard definition in digital television for example). The input sequence is also considered to be sub-sampled, in accordance with the architecture of the SVC encoder as described in FIG. 1.

In the invention, it is sought to build a hierarchical epitome which could advantageously be encoded by an SVC encoder and serve to predict the different layers of the SVC video. Thus, it is sought to generate a hierarchical epitome which gives an efficient compromise between:
  an efficient encoding of the current image (or of a set of images of the sequence to be processed jointly, to which the current image belongs) by prediction on the basis of this hierarchical epitome at the level of resolution i;

an efficient encoding of the current image (or of a set of images of the sequence to be processed jointly, to which the current image belongs) by prediction on the basis of this hierarchical epitome at the level of resolution i−1; and an efficient encoding of the hierarchical epitome itself.

A) Building of the Epitome

During the building step 21, the encoder, for at least one current image Ic of the sequence, builds a hierarchical epitome EPH representing the current image at the level of maximum resolution.

To this end, the encoder first of all generates an epitome associated with the enhancement layer corresponding to the level of maximum resolution i of the current image, denoted as EP(i) enabling the prediction of the current image with a quality Q(i) in using a classic technique for building epitomes, such as the maximum likelihood type of technique presented by Q. Wang et al. in the document "*Improving Intra Coding in H.264\AVC by Image Epitome, Advances in Multimedia Information Processing*".

This epitome EP(i) is sub-sampled (210) as if it had to be encoded by the SVC encoder to obtain an epitome at the level of lower resolution i−1 denoted as EP(i−1).

The encoder then verifies (211) that an encoding criterion is met. For example, the encoder determines an overall encoding cost associated with the two levels of resolution i and i−1, denoted as GG (i, i−1) on the basis of an estimation of the cost of encoding the hierarchical epitome, denoted as CCE, of an estimation of the quality of the prediction at the level i−1, denoted as Q(i−1) and the quality of the prediction at the level i, denoted as Q(i).

If the total cost thus estimated is lower than a predetermined threshold, it means that the quality of prediction for the different levels of resolution is not sufficient. It is therefore necessary to refine the epitomes obtained at the different levels of resolution.

More specifically, the encoder implements:
a refining 212 of the epitome EP(i−1) obtained at the level of lower resolution i−1, delivering a refined epitome at the level of lower resolution EPR(i−1), enabling a better quality prediction to be provided at the level of the resolution i−1;
an over-sampling 213 of the refined epitome EPR(i−1) (as if it had to be encoded by the SVC encoder) to obtain a new epitome at the level of higher resolution denoted as ER(i); and
a refining 214 of the epitome ER(i), delivering a refined epitome at the higher level, denoted as EPR(i).

The encoder reiterates the steps 210 to 214 so long as the encoding criterion is not met, i.e. so long as the overall cost is not greater than or equal to a predetermined threshold. When this condition is fulfilled, it means that the quality of prediction is sufficient for the different levels of resolution.

The hierarchical epitome EPH obtained at the end of the building step 210 corresponds to the epitome at the level of maximum resolution obtained after refining EPR(i).

It can be noted that the steps of refining of the epitome (at the higher resolution level 214 or at the lower resolution level 212) are implemented to improve the quality of prediction at the level of resolution of the epitome. Thus, the refining of the epitome EP(i−1) serves to provide a better prediction at the level of lower resolution i−1.

To this end, the steps for refining eliminate at least one portion of the corresponding epitome.

In order to determine the portion of the epitome that can be eliminated at a level of resolution, a prediction of the current image (to be rebuilt) is made from the non-refined epitome at this level of resolution, and the zones of the epitome (blocks, pixels, sets of pixels) effectively serving for the prediction are determined, to then eliminate the zones which do not serve or hardly serve for the prediction. For example, a prediction is made of the current image (to be rebuilt) at the resolution level i−1 on the basis of the epitome EP(i−1), and the zones of the epitome EP(i−1) that have not served for the prediction are eliminated to obtain the refined epitome EPR(i−1). To this end, it is possible to use one counter per block/pixel/set of pixels and eliminate the blocks/pixels/set of pixels that have not served or served little for the prediction.

In a context with N levels of resolution, if it is perceived that the epitome obtained at a level of resolution lower than the maximum resolution level is not a high-quality predictor, then this epitome can be refined and it is possible to go up to a level of higher resolution rather than continue to descend to a level of yet lower resolution.

It can be noted that, in this example described here above, the hierarchical epitome is built from a single image having different levels of resolution.

It is also possible to build a hierarchical epitome from a set of at least two images of the sequence, as proposed by the inventors of the present application in the French patent application No. 1058748 filed on 25 Oct. 2010.

To this end, prior to the building step 21, a set of images of the sequence to be jointly processed is chosen to build a hierarchical epitome. These are for example images belonging to a same plane or to a same GOP (group of pictures) as the current image. The set of images used to build the hierarchical epitome can also be a list of reference images of the current image defined for example according to the MPEG4 standards, part 10/H.264, etc.

We then determine a hierarchical epitome for each of the images of said set, in using the technique described here above and a "overall" hierarchical epitome is built from these hierarchical epitomes as described in the above-mentioned patent application. As a variant, the encoder builds the "overall" hierarchical epitome in using a dynamic set such as a list of reference images for the current image. It also possible to update the "overall" hierarchical epitome from a complementary hierarchical epitome computed on the basis of a new image of the dynamic set, denoted as EPHc. The "overall" hierarchical epitome is therefore computed gradually for each new image to be encoded belonging to a same plane, a same GOP, etc.

B) Prediction from the Epitome

The hierarchical epitome obtained at the end of this building step 21 is a high-quality predictor for the different levels of resolution of the current image or of the set of images of the sequence that are to be processed jointly, to which the current image belongs. It can therefore be used as a reference image for the encoder to make a prediction of the current image.

Thus, at the end of the building step 21, the encoder makes a prediction 31 of the current image denoted as Ip from the hierarchical epitome EPH. Such a prediction can be of an intra type or of an inter type within a same layer or it can be an inter-layer prediction.

For example, when the hierarchical epitome EPH is built from a single image having different levels of resolution, an intra prediction of the current image can be made from the hierarchical epitome EPH. To do so, it is possible to apply a "template matching" type technique using a search for a similar pattern in the hierarchical epitome EPH on the basis of known observations in a neighborhood of the zone to be rebuilt. Thus, the hierarchical epitome block which possesses the closest neighborhood of a block of the current image being predicted is used for this prediction.

When the hierarchical epitome EPH is built from a set of images of the sequence, an inter prediction of the current image can be implemented from the hierarchical epitome EPH, as described in the French patent application no 1058748 mentioned here above. To this end, a motion compensation or template matching type of technique is applied for example.

For the motion compensation, the hierarchical epitome EPH thus built is considered to be a reference image, and the current image Ic is predicted from the motion vectors pointing from the current image towards the hierarchical epitome EPH (backward compensation) or from the hierarchical epitome EPH towards the current image (forward motion compensation).

For the template matching, the block of the hierarchical epitome that possesses the closest neighborhood of a block of the current image being predicted is used for this prediction.

An inter-layer prediction of the data can also be done from the hierarchical epitome.

For example, when a zone Z(i) of the hierarchical epitome EPH at the level i has served to make a prediction (intra or inter prediction) of a block B(i) of the image being encoded at the level i, it is possible, for the prediction of the intra block co-localized in the layer (i+1), denoted as B(i+1), to use information on the hierarchical epitome EPH at the level (i+1) corresponding to the information on the hierarchical epitome EPH at the level i in the co-localized zone Z(i+1).

C) Encoding and Transmission of the Image

It is then possible, during an encoding step 32, to encode the prediction residue obtained by comparison between the current image Ic and the predicted image Ip.

D) Encoding and Transmission of the Epitome

The step for encoding and transmitting the hierarchical epitome 33 is optional.

Indeed, according to a first embodiment, the hierarchical epitome EPH used for encoding the current image Ic is not transmitted to the decoder. This hierarchical epitome on the contrary is regenerated at the decoder on the basis of the previously encoded/decoded images of the sequence and possibly of the causal neighborhood of the current image, in using the same building technique as the one used when encoding.

According to a second embodiment, the hierarchical epitome EPH or a complementary epitome EPHc used for the encoding of the current image Ic is transmitted to the decoder. The hierarchical epitome EPH or complementary epitome EPHc associated with the level of maximum resolution i is then encoded by the SVC encoder.

E) End of Encoding Algorithm

If the current image is the last image of the sequence of images (test 34, Ic=In?), the encoding algorithm is stopped.

If not, the operation passes to the image following the current image in the sequence according to the encoding order (Ic+1) and the operation returns to the step 21 for building the epitome for this new image.

It can be noted that the step 31 for predicting could implement another mode of encoding, for at least one image of the sequence. Indeed, the mode of encoding chosen for the prediction is the mode that offers the best compromise between bit rate and distortion from among all the pre-existing modes and the new modes of encoding based on the use of a hierarchical epitome (in intra mode or inter mode).

In particular, the step 31 for predicting can implement another mode of encoding for at least one block of an image of the sequence if the prediction is implemented block by block.

Thus, as a variant, the step for predicting 31 can be preceded by a test to determine whether the mode of rebuilding from the hierarchical epitome (denoted as M_EPIT) is the best. If this is not the case, the step 31 for predicting can implement another prediction technique.

In other words, for each block to be encoded at each level of resolution of the SVC encoder, a test is made on the mode of rebuilding using a prediction (intra or inter prediction) from the hierarchical epitome at this level of resolution and this mode is kept if it is better than the others.

3. Signal Representing the Image Sequence

The signal generated by the encoder can carry different pieces of information depending on whether or not the hierarchical epitome or a complementary hierarchical epitome is transmitted to the decoder for at least one image of the sequence.

Thus, for example, such a signal comprises at least one indicator to signal the fact that a hierarchical epitome is used to predict one or more images of the sequence, that a hierarchical epitome or several hierarchical epitomes are transmitted in the signal, that a complementary hierarchical epitome or several complementary hierarchical epitomes are transmitted in the signal, etc.

It can be noted that the hierarchical epitomes or complementary hierarchical epitomes which are image data can be encoded in the signal as images of the sequence.

4. Working of the Decoder

Figure 4:
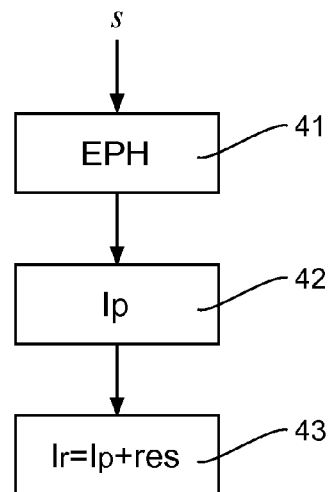

FIG. 4 illustrates the main steps implemented by the decoder according to the invention.

Such a decoder inputs a signal s representing a sequence of images.

It implements a step 41 for obtaining, for at least one image to be rebuilt Ir, a hierarchical epitome EPH associated with the corresponding enhancement layer at the level of maximum resolution of the image to be rebuilt and possibly a prediction residue associated with the image to be rebuilt.

According to a first embodiment, the epitome used for the encoding of the current image Ic is not transmitted to the decoder. For example, in the signal representing the sequence of images, the decoder reads at least one indicator signaling the fact that a hierarchical epitome has been used to predict the image to be rebuilt, and that this hierarchical epitome is not transmitted in the signal.

The step for obtaining 41 then implements a step for building the hierarchical epitome EPH similar to that implemented by the encoder, from previously encoded/decoded images of the sequence, and possibly from the causal neighborhood of the image to be rebuilt.

According to a second embodiment, the hierarchical epitome EPH used for the encoding of the current image Ic is transmitted to the decoder. For example, the decoder reads in the signal representing the sequence of images at least one indicator signaling the fact that a hierarchical epitome has been used to predict the image to be rebuilt and that this hierarchical epitome is transmitted in the signal.

The step 41 for obtaining then implements a step for reading the hierarchical epitome (or a complementary hierarchical epitome) in the signal.

Once the hierarchical epitome has been obtained, the decoder implements a prediction 42 of the image to be rebuilt. If the image to be rebuilt or at least one block of the image to be rebuilt has been predicted for encoding from the hierarchical epitome (mode M_EPIT), the step 42 for predicting makes a prediction (by motion compensation, template matching, etc) from the hierarchical epitome, similar to that made by the previously described encoder.

The decoder therefore uses the hierarchical epitome as an alternative prediction source enabling predictions to be made with the appropriate level of quality/resolution.

The image Ir can then be rebuilt during a step for decoding 43 by adding the prediction residue to the image obtained at the end of the step 42 for predicting.

5. Structure of the encoder and the decoder

Figure 5:
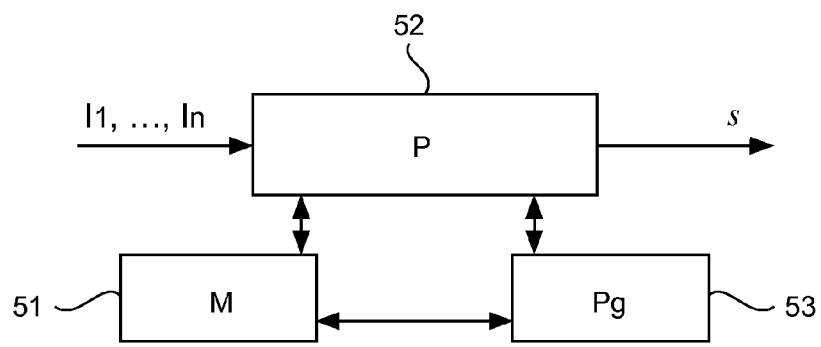
FIGS. 5 and 6 present simplified structures of an encoder and a decoder according to one particular embodiment of the invention.
Figure 6:
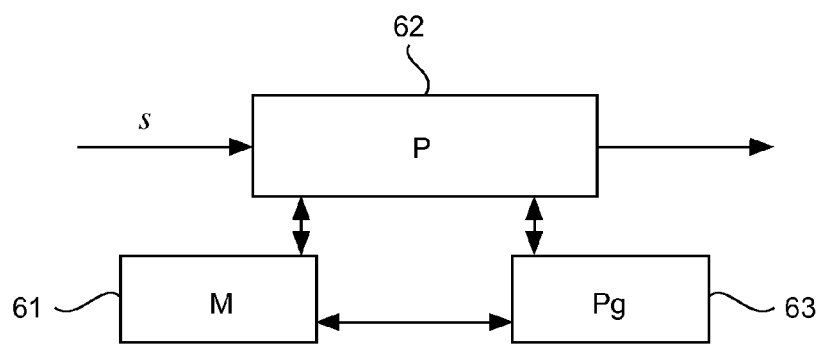

Finally, referring to FIGS. 5 to 6, we present the simplified structure of an encoder and a decoder respectively implementing a technique for encoding and a technique for decoding according to one of the embodiments described here above.

For example, the encoder comprises a memory 51 comprising a buffer memory M, a processing unit 52 equipped for example with a processor P and driven by at least one computer program Pg 53 implementing the encoding method according to the invention.

At initialization, the code instructions of the computer program 53 are for example loaded into a RAM and then executed by the processor of the processing unit 52. The processing unit 52 inputs a sequence of images to be encoded. The processor of the processing unit 52 implements the steps of the method for encoding described here above according to the instructions of the computer program 53 to encode at least one current image of the sequence. To this end, the encoder comprises, in addition to the memory 51, means for building a hierarchical epitome associated with the enhancement layer corresponding to the level of maximum resolution of the current image. These means are driven by the processor of the processing unit 52.

The decoder for its part comprises a memory 61 comprising a buffer memory M, a processing unit 62, equipped for example with a processor P and driven by a computer program Pg 63, implementing the method for decoding according to the invention.

At initialization, the code instructions of the computer program 63 are for example loaded into a RAM and then executed by the processor of the processing unit 62. The processing unit 62 inputs a signal representing the sequence of images. The processor of the processing unit 62 implements the steps of the decoding method described here above according to the instructions of the computer program 63 to decode and rebuild at least one image of the sequence. To this end, the computer comprises, in addition to the memory 61, means for obtaining a hierarchical epitome associated with the enhancement layer corresponding to the level of maximum resolution of the image to be rebuilt. These means are driven by the processor of the processing unit 62.

Although the present disclosure has been described with reference to one or more examples, workers skilled in the art will recognize that changes may be made in form and detail without departing from the scope of the disclosure and/or the appended claims.

The invention claimed is:

1. A method comprising:
  encoding a sequence of images with an encoding device, delivering a signal having a layered organization comprising for at least one image of said sequence at least one enhancement layer and at least one preceding layer, the enhancement layer corresponding to a level of maximum spatial resolution of said at least one image of said sequence, the preceding layer corresponding to a level of spatial resolution of said at least one image lower than the level of spatial resolution of said enhancement layer, wherein said enhancement layer is encoded by prediction at least from said at least one preceding layer,
  wherein during encoding of said at least one image into said signal, the encoding device implements, for said at least one image,
    a step of building a hierarchical epitome (EPH) representing said at least one image at the level of maximum spatial resolution, wherein said hierarchical epitome (EPH) is associated with the enhancement layer, and wherein said step of building implements at least one iteration of the following steps:
    at least one sub-sampling of a first epitome (EP$_i$) at a level of higher spatial resolution, where for the first iteration, the level of higher spatial resolution is the level of maximum spatial resolution, so as to obtain a second epitome (EP$_{i-1}$) at a level of lower spatial resolution of said at least one image;
    verification of an encoding criterion:
      if said encoding criterion is not attained:
        refining of said second epitome (EP$_{i-1}$) at the level of lower spatial resolution, delivering a refined epitome (EPR$_{i-1}$) at the level of lower spatial resolution;
        at least one over-sampling of said refined epitome (EPR$_{i-1}$) at the level of lower spatial resolution, delivering a new epitome (ER$_i$) at the level of higher spatial resolution;
        refining said new epitome (ER$_i$) at the level of higher spatial resolution;
      if said encoding criterion is attained:
        obtaining said hierarchical epitome (EPH), corresponding to said new epitome (ER$_i$) at the level of maximum spatial resolution obtained after refinement, if any in a prior iteration, or corresponding to said first epitome (EPi) at the level of maximum spatial resolution in case of no refinement, and stopping of the iterations;
    a step of the encoding device predicting said at least one image from said hierarchical epitome (EPH).

2. The method for encoding according to claim 1, wherein said step for refining eliminates at least one portion of said second epitome or said new epitome.

3. The method for encoding according to claim 1, wherein said encoding criterion takes account of a quality of prediction associated with different levels of spatial resolution and of a cost of encoding of the hierarchical epitome.

4. The method for encoding according to claim 1, wherein the method comprises a step of transmitting said hierarchical epitome to at least one decoder intended for decoding said sequence of image.

5. The method for encoding according to claim 1, wherein said hierarchical epitome is determined from a set of at least two images of said sequence.

6. A device configured to encode a sequence of images delivering a signal having a layered organization comprising, for at least one image of said sequence, at least one enhancement layer and at least one preceding layer, the enhancement layer corresponding to a level of maximum spatial resolution of said at least one image of said sequence, the preceding layer corresponding to a level of spatial resolution of said at least one image lower than the level of spatial resolution of the enhancement layer, wherein said enhancement layer is encoded by prediction at least from said at least one preceding layer, wherein the device comprises:

an input for receiving the sequence of images;
an output delivering the signal having the layered organization;
a non-transitory computer-readable memory storing code instructions; and
a processing device, which is configured by the code instructions to build at least one hierarchical epitome (EPH) representing said at least one image at the level of maximum spatial resolution, and wherein said hierarchical epitome (EPH) is associated with the enhancement layer, wherein the processing device builds the at least one hierarchical epitome by implementing at least one iteration of the following steps:
at least one sub-sampling of a first epitome ($EP_i$) at the level of higher spatial resolution, where for the first iteration, the level of higher spatial resolution is the level of maximum spatial resolution, so as to obtain an second epitome ($EP_{i-1}$) at a level of lower spatial resolution of said at least one image;
verification of an encoding criterion:
    if said encoding criterion is not attained:
        refining of said second epitome ($EP_{i-1}$) at a level of lower spatial resolution, delivering a refined epitome ($EPR_{i-1}$) at the level of lower spatial resolution;
        at least one over-sampling of said refined epitome ($EPR_{i-1}$) at the level of lower spatial resolution, delivering a new epitome ($ER_i$) at a level of higher spatial resolution;
        refining said new epitome ($ER_i$) at the level of higher spatial resolution;
    if said encoding criterion is attained:
        obtaining said hierarchical epitome (EPH), corresponding to said new epitome ($ER_i$) at the level of maximum spatial resolution obtained after refinement, if any in a prior iteration, or corresponding to said first epitome (EPi) at the level of maximum spatial resolution in case of no refinement, and stopping of the iterations;
and wherein the encoding device predicts said at least one image from said hierarchical epitome (EPH).

7. A method comprising:
generating a signal representing a sequence of images encoded with an encoding device, the signal having a layered organization comprising, for at least one image of said sequence, one enhancement layer and at least one preceding layer,
the enhancement layer corresponding to a level of maximum spatial resolution of said sequence, the preceding layer corresponding to a level of spatial resolution lower that is higher than the level of spatial resolution of the enhancement layer, and wherein said enhancement layer is encoded by prediction at least from said at least one preceding layer,
wherein generating includes building with the encoding device a hierarchical epitome (EPH) representing said at least one image at the level of maximum spatial resolution, and wherein said hierarchical epitome (EPH) is associated with the enhancement layer, wherein said building implements at least one iteration of the following steps:
at least one sub-sampling of a first epitome ($EP_i$) at the level of higher spatial resolution, where for the first iteration, the level of higher spatial resolution is the level of maximum spatial resolution, so as to obtain a second epitome ($EP_{i-1}$) at a level of lower spatial resolution;
verification of an encoding criterion:
    if said encoding criterion is not attained:
        refining of said second epitome ($EP_{i-1}$) at a level of lower spatial resolution, delivering a refined epitome ($EPR_{i-1}$) at the level of lower spatial resolution;
        at least one over-sampling of said refined epitome ($EPR_{i-1}$) at the level of lower spatial resolution, delivering a new epitome ($ER_i$) at a level of higher spatial resolution;
        refining said new epitome ($ER_i$) at the level of higher spatial resolution;
    if said encoding criterion is attained:
        obtaining said hierarchical epitome (EPH), corresponding to said new epitome ($ER_i$) at the level of maximum spatial resolution obtained after refinement, if any in a prior iteration, or corresponding to said first epitome (EPi) at the level of maximum spatial resolution in case of no refinement, and stopping of the iterations;
and wherein generating includes predicting said at least one image from said hierarchical epitome (EPH),
wherein said signal carries at least one indicator signaling a use of said hierarchical epitome (EPH) to predict said image and/or a presence of said hierarchical epitome in said signal; and
outputting the signal from the encoding device.

8. A method comprising:
decoding, with a decoding device, a signal representing a sequence of images having a layered organization comprising, for at least one image of said sequence, one enhancement layer and at least one preceding layer, the enhancement layer corresponding to a level of maximum spatial resolution of said at least one image of said sequence, the preceding layer corresponding to a level of spatial resolution of said at least one image lower than the level of spatial resolution of the enhancement layer, wherein the enhancement layer is encoded by prediction at least from said at least one preceding layer,
wherein during decoding the decoding device implements, for said at least one image to be rebuilt of said sequence, a step of obtaining a hierarchical epitome (EPH) representing said at least one image at the level of maximum spatial resolution, and wherein said hierarchical epitome (EPH) is associated with the enhancement layer corresponding to the level of maximum spatial resolution of said image to be rebuilt,
wherein said hierarchical epitome is built when encoded or else rebuilt when decoding,
and wherein said hierarchical epitome is built when encoding or rebuilt when decoding by implementing at least one iteration of the following steps:
at least one sub-sampling of a first epitome ($EP_i$) at a level of higher spatial resolution, where for the first iteration, the level of higher spatial resolution is the level of maximum spatial resolution, so as to obtain a second epitome ($EP_{i-1}$) at a level of lower spatial resolution;
verification of an encoding criterion:
    if said encoding criterion is not attained:
        refining of said second epitome ($EP_{i-1}$) at the level of lower spatial resolution, delivering a refined epitome ($EPR_{i-1}$) at the level of lower spatial resolution;

at least one over-sampling of said refined epitome ($EPR_{i-1}$) at the level of lower spatial resolution, delivering a new epitome ($ER_i$) at a level of higher spatial resolution;

refining said new epitome ($ER_i$) at the level of higher spatial resolution;

if said encoding criterion is attained:

obtaining said hierarchical epitome (EPH), corresponding to said new epitome ($ER_i$) at the level of maximum spatial resolution obtained after refinement, if any in a prior iteration, or corresponding to said first epitome (EPi) at the level of maximum spatial resolution in case of no refinement, and stopping of the iterations; and a step of the decoding device predicting the image to be rebuilt from the hierarchical epitome.

9. A device configured to decode decoding a signal representing a sequence of images having a layered organization comprising, for at least one image of said sequence to be rebuilt, one enhancement layer and at least one preceding layer, the enhancement layer corresponding to a level of maximum spatial resolution of said at least one image of said sequence, the preceding layer corresponding to a level of spatial resolution of said at least one image lower than the level of spatial resolution of the enhancement layer, wherein said enhancement layer is encoded by prediction at least from said at least one preceding layer, wherein the device comprises:

an input for receiving the signal;

an output delivering the sequence of images;

a non-transitory computer-readable memory storing code instructions; and a processing device configured by the code instructions to obtain at least one hierarchical epitome (EPH) representing said at least one image at the level of maximum spatial resolution, and wherein said hierarchical epitome (EPH) is associated with the enhancement layer, wherein said hierarchical epitome is built when the sequence of images are encoded and received in the signal, or else rebuilt by the device when decoding, and wherein said hierarchical epitome (EPH) is built when encoding or rebuilt when decoding by implementing at least one iteration of the following steps:

at least one sub-sampling of a first epitome ($EP_i$) at a level of higher spatial resolution, where for the first iteration, the level of higher spatial resolution is the level of maximum spatial resolution, so as to obtain a second epitome ($EP_{i-1}$) at a level of lower spatial resolution;

verification of an encoding criterion:

if said encoding criterion is not attained:

refining of said second epitome ($EP_{i-1}$) at the level of lower spatial resolution, delivering a refined epitome ($EPR_{i-1}$) at the level of lower spatial resolution;

at least one over-sampling of said refined epitome ($EPR_{i-1}$) at the level of lower spatial resolution, delivering a new epitome ($ER_i$) at a level of higher spatial resolution;

refining said new epitome ($ER_i$) at the level of higher spatial resolution;

if said encoding criterion is attained:

obtaining said hierarchical epitome (EPH), corresponding to said new epitome ($ER_i$) at the level of maximum spatial resolution obtained after refinement, if any in a prior iteration, or corresponding to said first epitome (EPi) at the level of maximum spatial resolution in case of no refinement, and stopping of the iterations;

and to predict the image to be rebuilt from the hierarchical epitome.

10. A non-transitory computer-readable recording medium comprising a computer program recorded thereon and comprising instructions for implementing a method for encoding a sequence of images, when this program is executed by a processor, wherein the method comprises:

instructions that configure the processor to encode the sequence of images and deliver a signal having a layered organization comprising, for at least one image of said sequence, one enhancement layer and at least one preceding layer, the enhancement layer corresponding to a level of maximum spatial resolution of said at least one image of said sequence, the preceding layer corresponding to a level of spatial resolution of said at least one image lower than the level of spatial resolution of said enhancement layer, wherein said enhancement layer is encoded by prediction at least from said at least one preceding layer; and instructions that configure the processor to implement a step of building a hierarchical epitome (EPH) representing said at least one image at the level of maximum spatial resolution, and wherein said hierarchical epitome (EPH) is associated with the enhancement layer, and a step of predicting said at least one image from said hierarchical epitome (EPH), wherein said step of building implements at least one iteration of the following steps:

at least one sub-sampling of a first epitome ($EP_i$) at a level of higher spatial resolution where for the first iteration, the level of higher spatial resolution is the level of maximum spatial resolution, so as to obtain a second epitome ($EP_{i-1}$) at a level of lower spatial resolution;

verification of an encoding criterion:

if said encoding criterion is not attained:

refining of said second epitome ($EP_{i-1}$) at the level of lower spatial resolution, delivering a refined epitome ($EPR_{i-1}$) at the level of lower spatial resolution;

at least one over-sampling of said refined epitome ($EPR_{i-1}$) at the level of lower spatial resolution, delivering a new epitome ($ER_i$) at a level of higher spatial resolution;

refining said new epitome ($ER_i$) at the level of higher spatial resolution;

if said encoding criterion is attained:

obtaining said hierarchical epitome (EPH), corresponding to said new epitome ($ER_i$) at the level of maximum spatial resolution obtained after refinement, if any in a prior iteration, or corresponding to said first epitome (EPi) at the level of maximum spatial resolution in ease of no refinement, and stopping of the iterations.

11. A non-transitory computer-readable recording medium comprising a computer program recorded thereon and comprising instructions for implementing a method for decoding a signal representing a sequence of images, when this program is executed by a processor, wherein the method comprises:

instructions that configure the processor to decode the signal and deliver said sequence of images, said signal having a layered organization comprising for at least one image to be rebuilt of said sequence, one enhancement layer and at least one preceding layer, the enhancement layer corresponding to a level of maximum spatial resolution of said at least one image of said sequence, the preceding layer corresponding to a level of spatial resolution of said at least one image lower than the level of spatial resolution of said enhancement layer, wherein said enhancement layer is encoded by prediction at least from said at least one preceding layer, instructions that configure the processor to implement a step of obtaining a hierarchical epitome (EPH) associated with the enhancement layer, wherein said hierarchical epitome is built when encoding and read in said signal, or else rebuilt during decoding, and a step of predicting the image to be rebuilt from the hierarchical epitome, and wherein said hierarchical epitome (EPH) is built when encoding or rebuilt when decoding by implementing at least one iteration of the following steps:

at least one sub-sampling of a first epitome ($EP_i$) at a level of higher spatial resolution where for the first iteration, the level of higher spatial resolution is the level of maximum spatial resolution, so as to obtain a second epitome ($EP_{i-1}$) at a level of lower spatial resolution;

verification of an encoding criterion:

if said encoding criterion is not attained:

refining of said second epitome ($EP_{i-1}$) at a level of lower spatial resolution, delivering a refined epitome ($EPR_{i-1}$) at the level of lower spatial resolution;

at least one over-sampling of said refined epitome ($EPR_{i-1}$) at the level of lower spatial resolution, delivering a new epitome ($ER_i$) at a level of higher spatial resolution;

refining said new epitome ($ER_i$) at the level of higher spatial resolution;

if said encoding criterion is attained:

obtaining said hierarchical epitome (EPH), corresponding to said new epitome ($ER_i$) at the level of maximum spatial resolution obtained after refinement, if any in a prior iteration, or corresponding to said first epitome (EPi) at the level of maximum spatial resolution in case of no refinement, and stopping of the iterations.

* * * * *